(12) United States Patent
Johnson et al.

(10) Patent No.: US 11,150,192 B2
(45) Date of Patent: Oct. 19, 2021

(54) LIQUID ELECTRODE TIP

(71) Applicant: 2S WATER INCORPORATED, Edmonton (CA)

(72) Inventors: Neil Johnson, Edmonton (CA); Anders Palmgren, Edmonton (CA); Anthony Nelson, Edmonton (CA)

(73) Assignee: 2S WATER INCORPORATED, Edmonton (CA)

( * ) Notice: Subject to any disclaimer, the term of this patent is extended or adjusted under 35 U.S.C. 154(b) by 0 days.

(21) Appl. No.: 16/868,605

(22) Filed: May 7, 2020

(65) Prior Publication Data

US 2021/0223182 A1   Jul. 22, 2021

(30) Foreign Application Priority Data

Jan. 20, 2020   (CA) ..................................... 3068769

(51) Int. Cl.
*H01J 13/00*   (2006.01)
*G01N 21/69*   (2006.01)
(Continued)

(52) U.S. Cl.
CPC ............. *G01N 21/69* (2013.01); *G01N 21/67* (2013.01); *H01J 13/00* (2013.01); *H01J 13/10* (2013.01); *H01J 13/24* (2013.01); *H01J 13/244* (2013.01)

(58) Field of Classification Search
CPC ............... G01N 21/67; G01N 15/0255; G01N 15/0266; G01N 17/02; G01N 2015/0261; G01N 2021/95646; G01N 2030/8482; G01N 21/25; G01N 21/68; G01N 21/69; G01N 21/951; G01N 21/95684; G01N 2201/0221; G01N 27/62; G01N 27/68; G01N 33/50; G01N 27/06; G01N 27/4146; H01J 2237/334; H01J 37/32018; H01J 2237/2007; H01J 37/3244; H01J 37/32467; H01J 37/32462; H01J 49/0459;
(Continued)

(56) References Cited

U.S. PATENT DOCUMENTS 3,475,307 A   10/1969   Knox et al.
3,884,793 A   5/1975   Penfold et al.
(Continued)

FOREIGN PATENT DOCUMENTS

CA   2850980 A1 *   4/2013   ............ B02C 25/00
CN   1249063 A *   3/2000   .......... H01J 61/0677
(Continued)

*Primary Examiner* — Michael P Stafira
(74) *Attorney, Agent, or Firm* — Finch & Maloney, PLLC; Michael J. Bujold; Jay S. Franklin

(57) ABSTRACT

A liquid electrode tip has a housing with a top, a bottom and at least one peripheral side wall. The housing has a liquid inlet and a liquid outlet. The liquid outlet is located at the top of the housing. A solution reservoir is positioned within the housing. The solution reservoir has a solution inlet in fluid communication with the liquid inlet and a solution outlet in fluid communication with the liquid outlet. A conductor is positioned within the housing with at least a portion of the conductor being submerged by a liquid in the solution reservoir. A staging area at the top of the housing is provided into which the liquid from the solution reservoir flows from the liquid outlet.

20 Claims, 5 Drawing Sheets

(51) Int. Cl.
*G01N 21/67* (2006.01)
*H01J 13/10* (2006.01)
*H01J 13/24* (2006.01)

(58) Field of Classification Search
CPC ........... H01J 37/32477; H01J 37/32596; H01J 37/32715; H01J 37/3426; H01J 37/3438; H01J 49/0036; H01J 49/067; H01J 49/10; H01J 49/105; H01J 2237/06366; H01J 2237/204; H01J 2237/208; H01J 2237/226; H01J 2237/2814; H01J 2237/3132; H01J 2237/3321; H01J 2237/3341; H01J 27/024; H01J 37/06; H01J 37/20; H01J 37/222; H01J 37/265; H01J 37/28; H01J 37/3053; H01J 37/32045; H01J 37/32449; H01J 37/32495; H01J 37/32761; H01J 37/3277; H01J 37/32926; H01J 37/32935; H01J 37/32972; H01J 37/32981; H01J 37/3299; H01J 37/34; H01J 37/3467; H01J 49/0027; H01J 49/0031; H01J 49/04; H01J 49/0418; H01J 49/102; H01J 49/12; H01J 49/126; H01J 49/145; H01J 49/4215; H01J 17/491; H01J 61/72; H01J 11/12; H01J 61/12; H01J 17/04; H01J 61/09; H01J 1/025; H01J 17/494; H01J 61/305; H01J 17/06; H01J 27/08; H01J 3/025; H01J 3/04; H01J 61/067; H01J 61/66; H01J 61/78; H01J 11/24; H01J 11/32; H01J 17/49; H01J 2211/245; H01J 2211/323; H01J 17/066; H01J 11/14; H01J 11/28; H01J 17/48; H01J 2211/30; H01J 2893/0066; H01J 2893/007; H01J 9/02; H01J 17/492; H01J 61/94; H01J 11/34; H01J 17/44; H01J 37/077; H01J 61/92; H01J 17/22; H01J 17/40; H01J 2237/327; H01J 2893/0068; H01J 37/32192; H01J 37/3266; H01J 1/20; H01J 1/24; H01J 11/00; H01J 11/18; H01J 17/00; H01J 17/063; H01J 17/20; H01J 17/26; H01J 17/30; H01J 17/498; H01J 2237/2001; H01J 27/02; H01J 2893/0064; H01J 2893/0069; H01J 3/021; H01J 37/08; H01J 37/32; H01J 37/32082; H01J 37/32422; H01J 37/32568; H01J 37/32697; H01J 37/3405; H01J 61/06; H01J 61/0732; H01J 61/0737; H01J 61/541; H01J 61/545; H01J 61/822; H01J 61/86; H01J 65/046; H01J 11/16; H01J 13/00; H01J 13/10; H01J 13/24; H01J 13/244; H01J 17/14; H01J 17/186; H01J 17/497; H01J 2211/50; H01J 2211/62; H01J 2237/2516; H01J 2237/335; H01J 2237/3387; H01J 23/02; H01J 2893/0067; H01J 31/15; H01J 33/00; H01J 37/305; H01J 37/32055; H01J 37/32091; H01J 37/32623; H01J 37/32917; H01J 61/04; H01J 61/0672; H01J 61/0675; H01J 61/0677; H01J 61/16; H01J 61/56; H01J 61/76; H01J 9/045; H01J 9/12; H01J 9/241; H01J 9/248; H01J 9/261

See application file for complete search history.

(56) References Cited

U.S. PATENT DOCUMENTS

| | | | |
|---|---|---|---|
| 4,116,793 A | 9/1978 | Penfold et al. | |
| 4,406,658 A | 9/1983 | Lattin et al. | |
| 4,853,539 A | 8/1989 | Hall et al. | |
| 5,086,226 A | 2/1992 | Marcus | |
| 5,221,561 A | 6/1993 | Flicstein et al. | |
| 5,560,890 A | 10/1996 | Berman et al. | |
| 6,376,972 B1 | 4/2002 | Tarasenko et al. | |
| 6,388,381 B2 | 5/2002 | Anders | |
| 6,686,998 B2 | 2/2004 | Gianchandani et al. | |
| 7,929,138 B1 * | 4/2011 | Webb | G01N 21/67 356/344 |
| 8,278,810 B2 | 10/2012 | Foret | |
| 9,051,820 B2 | 6/2015 | Foret | |
| 9,761,413 B2 | 9/2017 | Foret | |
| 9,989,472 B2 | 6/2018 | Schroeder et al. | |
| 10,269,525 B2 | 4/2019 | Marcus et al. | |
| 2016/0307733 A1 | 10/2016 | Foret | |
| 2018/0247804 A1 | 8/2018 | Shelley et al. | |
| 2018/0372646 A1 * | 12/2018 | Wang | G01J 3/10 |
| 2019/0101493 A1 * | 4/2019 | Schroeder | H05H 1/48 |

FOREIGN PATENT DOCUMENTS

| | | | |
|---|---|---|---|
| CN | 102033103 A | 4/2011 | |
| WO | WO-9622151 A1 * | 7/1996 | ....... G01N 27/44752 |

\* cited by examiner

LIQUID ELECTRODE TIP

FIELD OF THE DISCLOSURE

The present application relates generally to a liquid electrode tip for use in solution cathode glow discharge (SCGD) and solution anode glow discharge (SAGD) devices.

BACKGROUND

This section provides background information to facilitate a better understanding of the various aspects of the invention. It should be understood that the statements in this section of this document are to be read in this light, and not as admissions of prior art.

In a traditional SCGD device, the grounding of a solution is created by excess flow from the liquid electrode tip contacting a grounded, conducting surface. Most often, this is created by a graphite rod that envelops the insulated glass capillary delivering the liquid flow. There are a number of drawbacks to this type of design.

Relying on a stream of excess solution to create a good electrical contact can be risky. Flow interruptions can originate from a variable pump rate, bubbles or obstructions in the inlet flow, bubble formation in the overflow channel resulting from water electrolysis, or a decrease in overflow due to an increase in water uptake into the glow discharge. These interruptions usually result in arc discharges that can damage equipment and render any measurements unusable.

In addition, requiring an overflow channel to maintain the grounding means that the device will generate liquid waste. This can be problematic if the volume of the liquid sample is limited or if the sample itself is hazardous. In traditional SCGD, samples are spiked with nitric acid to increase their conductivity and improve the atomic emission intensity of the plasma.

BRIEF SUMMARY

There is provided a liquid electrode tip. The liquid electrode tip has a housing with a top, a bottom and at least one peripheral side wall. The housing has a liquid inlet and a liquid outlet. The liquid outlet is located at the top of the housing. A solution reservoir is positioned within the housing. The solution reservoir has a solution inlet in fluid communication with the liquid inlet and a solution outlet in fluid communication with the liquid outlet. A conductor is positioned within the housing. At least a portion of the conductor is submerged by a liquid in the solution reservoir. A staging area is at the top of the housing into which the liquid from the solution reservoir flows from the liquid outlet.

In one embodiment, the housing contains an insulated medium to shield the conductor and the solution reservoir from a solid electrode spaced above and adjacent to the top of the housing.

In one embodiment, a fluid channel is provided in fluid communication with the solution outlet of the solution reservoir and the liquid outlet of the housing to connect the solution outlet to the liquid outlet.

In one embodiment, at least one vent is provided for venting bubbles from the solution reservoir to an exterior of the housing. In one embodiment, the bubbles are vented to the top of the housing.

In one embodiment, the top of the housing has a sloped cutout for directing overflow of the liquid exiting the liquid outlet away from the staging area.

In one embodiment, the top of the housing has a viewing cutout to maximize the field of view for a glow discharge.

In one embodiment, a pump is provided for pumping fluid from the solution reservoir to the staging area.

In one embodiment, the conductor has a loop. The loop is positioned below and adjacent the at least one vent.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
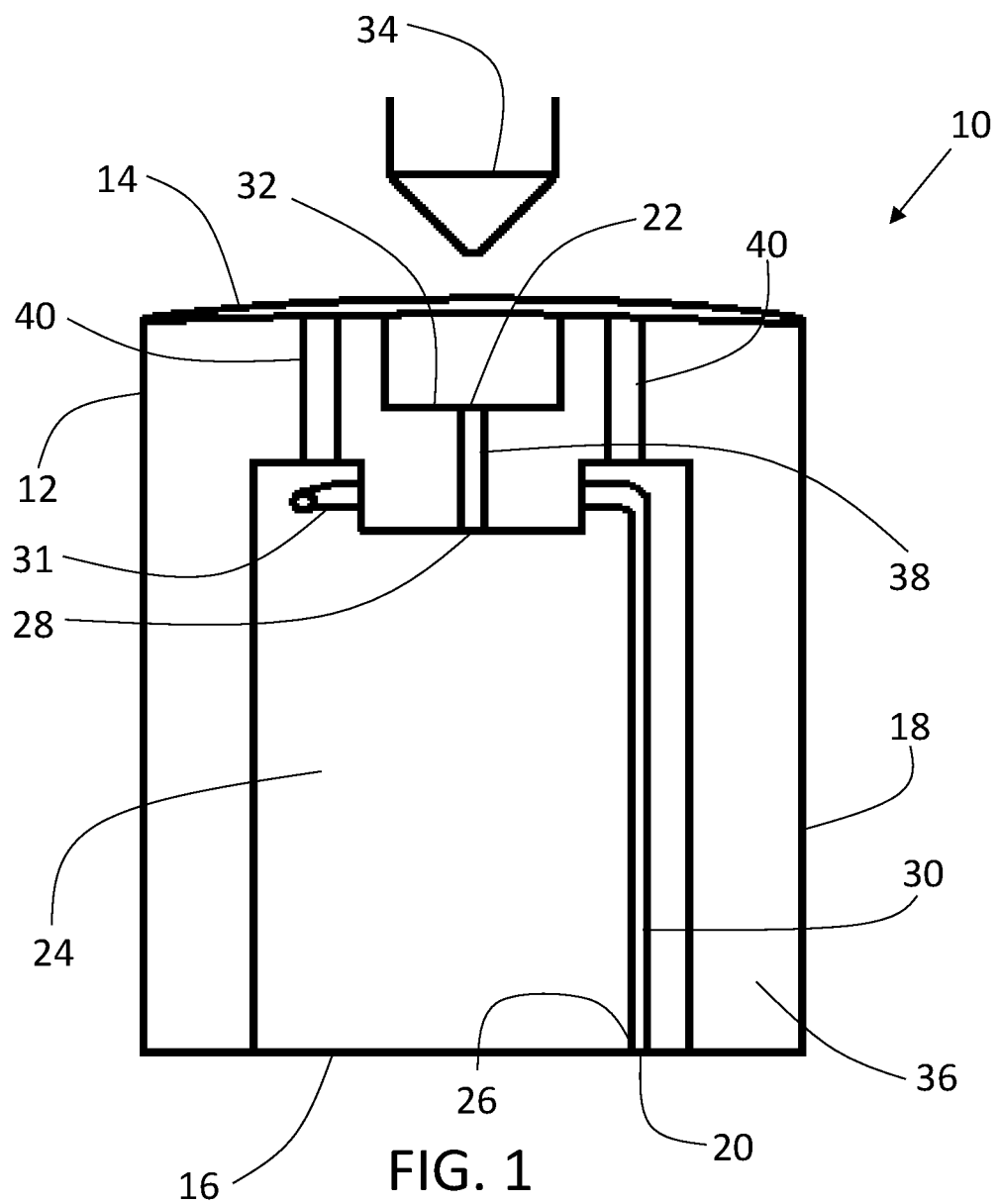
FIG. 1 is a front elevation view, in section, of a SAGD device with a liquid electrode tip.

A liquid electrode tip, generally identified by reference numeral 10, will now be described with reference to FIG. 1 through FIG. 5.

Figure 2:
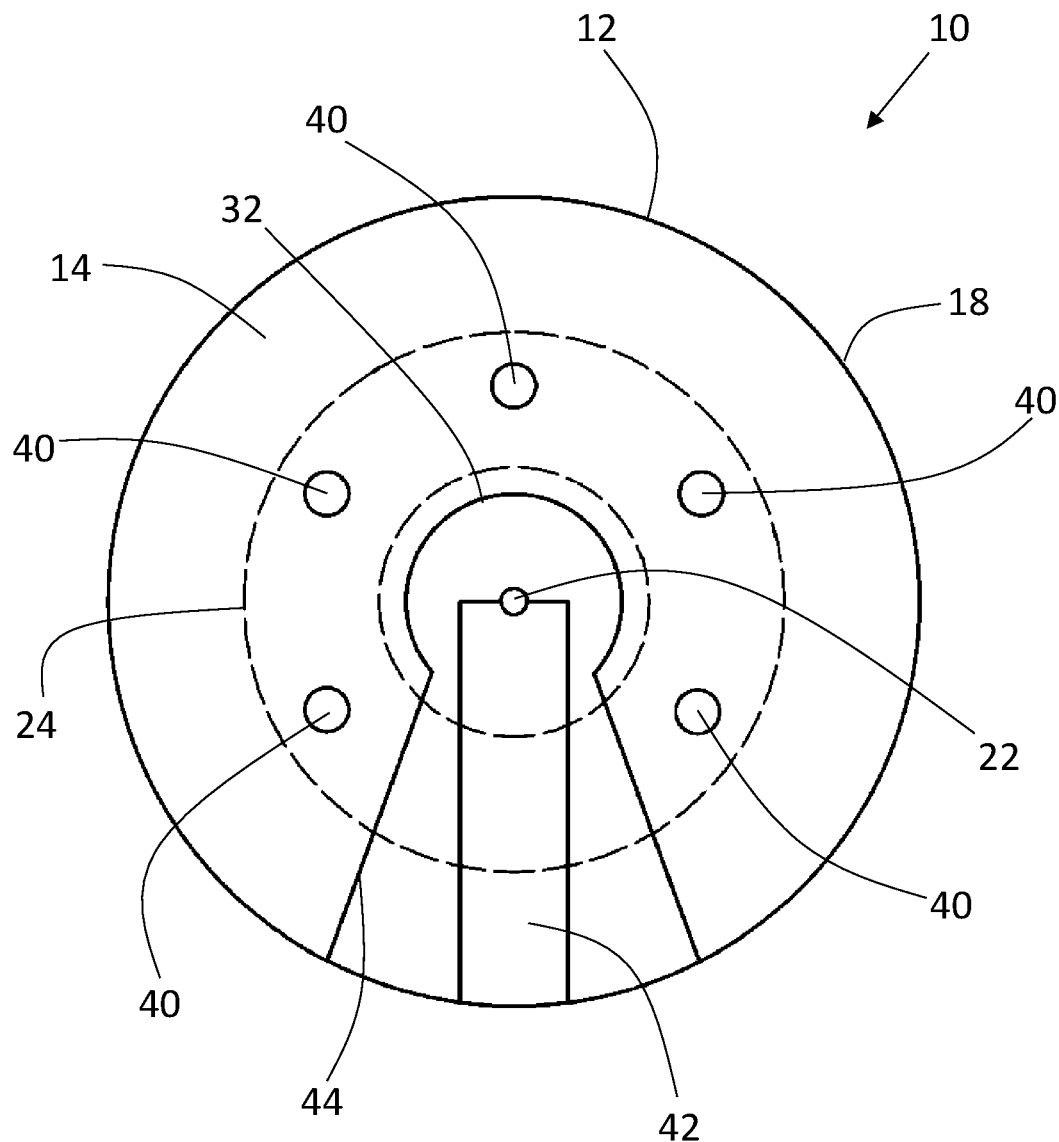
FIG. 2 is a top plan view, partially in section, of the liquid electrode tip shown in FIG. 1.
Figure 3:
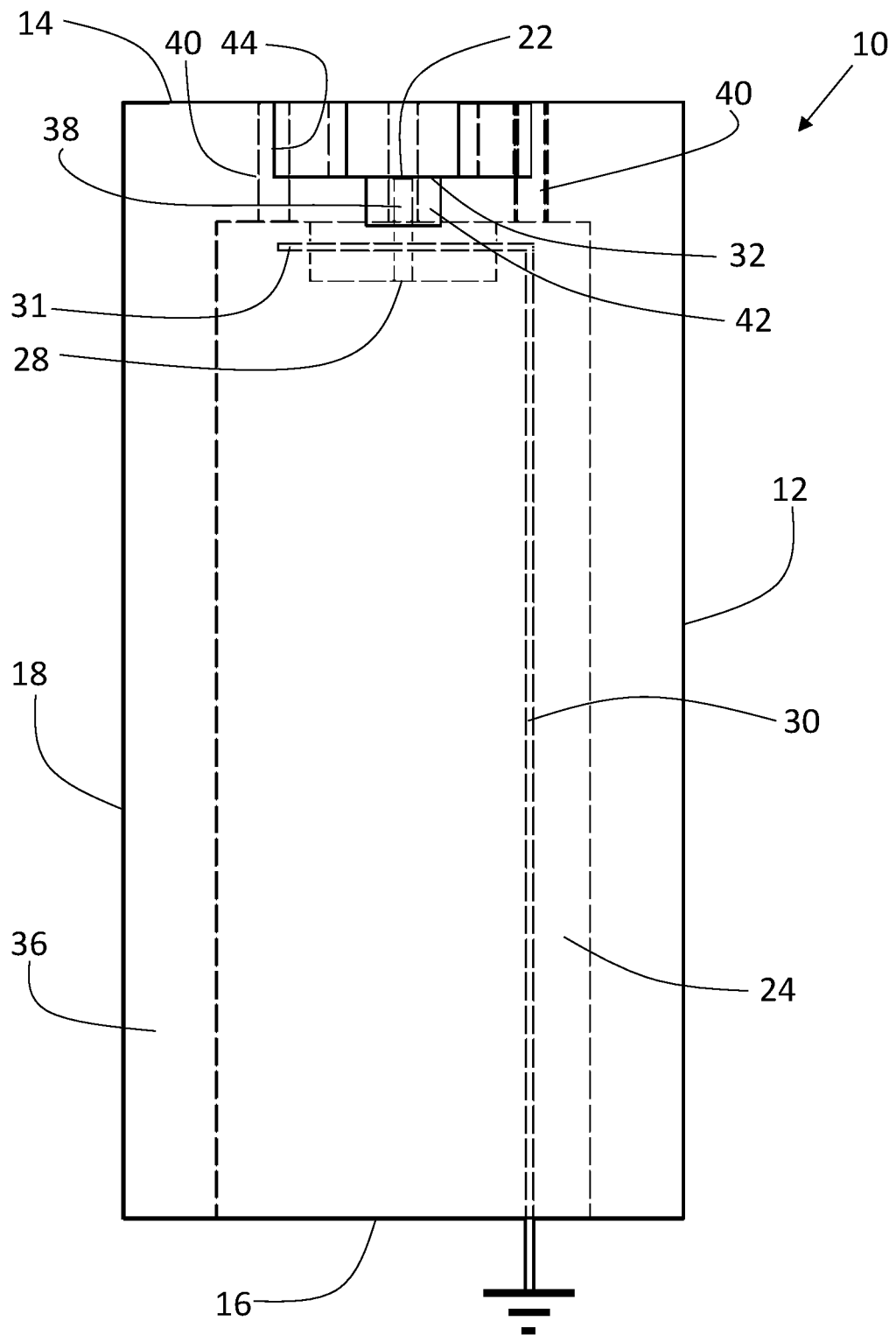
FIG. 3 is a front elevation view, partially in section, of the liquid electrode tip shown in FIG. 1.

Referring to FIG. 2 and FIG. 3, a liquid electrode tip 10 has a housing 12 with a top 14, a bottom 16 and at least one peripheral side wall 18. In the embodiment shown, housing 12 is cylindrical in shape, however it will be understood by a person skilled in the art that housing 12 may be any other suitable shape known to a person skilled in the art. Housing 12 has a liquid inlet 20 and a liquid outlet 22. Liquid outlet 22 is located at top 14 of housing 12. In the embodiment shown, liquid inlet 20 is positioned at a bottom of housing 12. A solution reservoir 24 is positioned within housing 12. Solution reservoir 24 holds the liquid to be tested by SAGD or SCGD methods. Solution reservoir 24 is filled in its entirety with solution from bottom of housing 12. Solution reservoir 24 has a solution inlet 26 in fluid communication with the liquid inlet 20 and a solution outlet 28 in fluid communication with liquid outlet 22. Solution flows through solution inlet 26 and fills up solution reservoir 24 until solution level reaches solution outlet 28 and outlet 22. Solution is expelled from housing 12 through liquid outlet 22 and solution level does not rise beyond the level of liquid outlet 22 as excess solution flows away from liquid outlet 22 in the same plane or angled downwards away from liquid outlet 22 to help prevent an increase in the level of solution. This helps to prevent solution from exiting from vents 40. In the embodiment shown, a fluid channel 38 provides for fluid communication between solution outlet 28 and liquid outlet 22. A conductor 30 is positioned within housing 12 with at least a portion of conductor 30 being submerged by the liquid in solution reservoir 24. In the embodiment shown, conductor 30 is a grounding wire composed of conducting, non-reactive substance to ground the liquid within solution reservoir 24. Conductor 30 has a loop 31 positioned within solution reservoir 24 below and adjacent vents 40. Loop 31 is used for grounding purposes. While solution may potentially be grounded further from liquid outlet 22, this may increase the power consumption of liquid electrode top 10 due to an increased electrical resistance. It could also cause hydrogen gas to be generated in fluid channel 38 which could cause an interruption of flow to liquid outlet 22. Loop 31 is positioned below and adjacent vents 40 so that hydrogen gas that may form on the surface of loop 31 naturally rises through vents 40 to help prevent interruption of flow through liquid outlet 22. Why is there a wire loop at the top? A staging area 32 at top 14 of housing 12 collects the liquid that flows from solution reservoir 24 through liquid outlet 22.

Referring to FIG. 1, housing 12 is preferably made of an insulating material to shield conductor 30 and solution reservoir 24 from the electrical potential of solid electrode 34 that is spaced above and adjacent to top 14 of housing 12. Housing 12 may also contain an insulating medium 36 to provide additional shielding to conductor 30 and solution reservoir 24 from the electrical potential of solid electrode 34. In one embodiment, insulating material and insulating medium 36 are a Macor ceramic, however it will be understood by a person skilled in the art that any insulating material that can handle being in close proximity to the glow discharge and also be compatible with the solution and electrolyte would work.

Conductor 30 can be a site for significant bubble nucleation due to the electrolysis of the liquid within solution reservoir 24. Vents 40 may be added to direct and vent the bubbles away from fluid channel 38 and solution outlet 28 so as to not interrupt liquid flow to the glow discharge. In the embodiment shown in FIG. 1, two vents 40 are provided. In the embodiment shown in FIG. 2, five vents 40 are provided. It will be understood by a person skilled in the art that different numbers of vents 40 may be provided. Vents 40 vent bubbles from solution reservoir 24 to an exterior of housing 12. In the embodiments shown, vents 40 vent bubbles to top 14 of housing 12.

Figure 4:
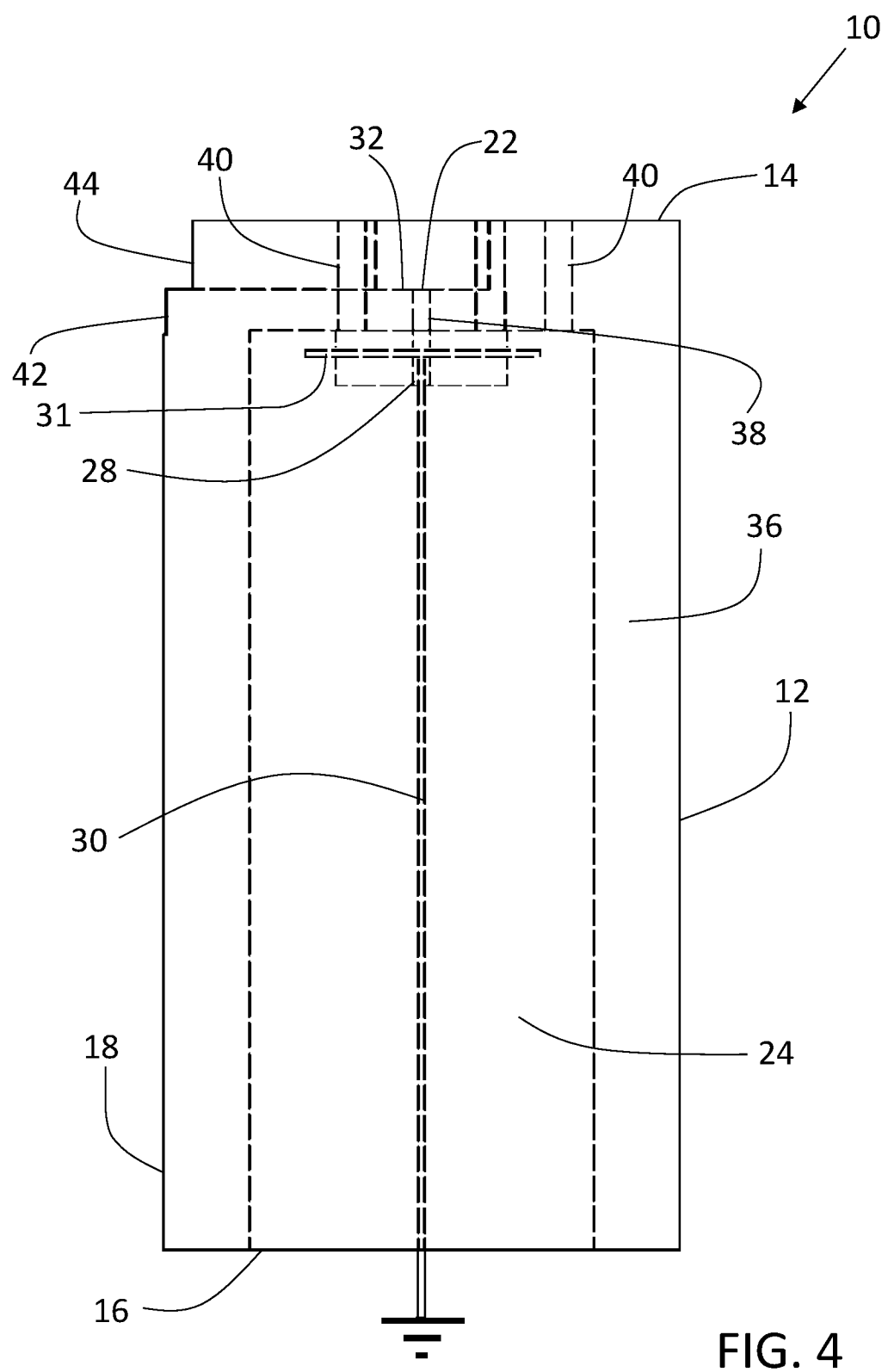
FIG. 4 is a side elevation view, partially in section, of the liquid electrode tip shown in FIG. 1.
Figure 5:
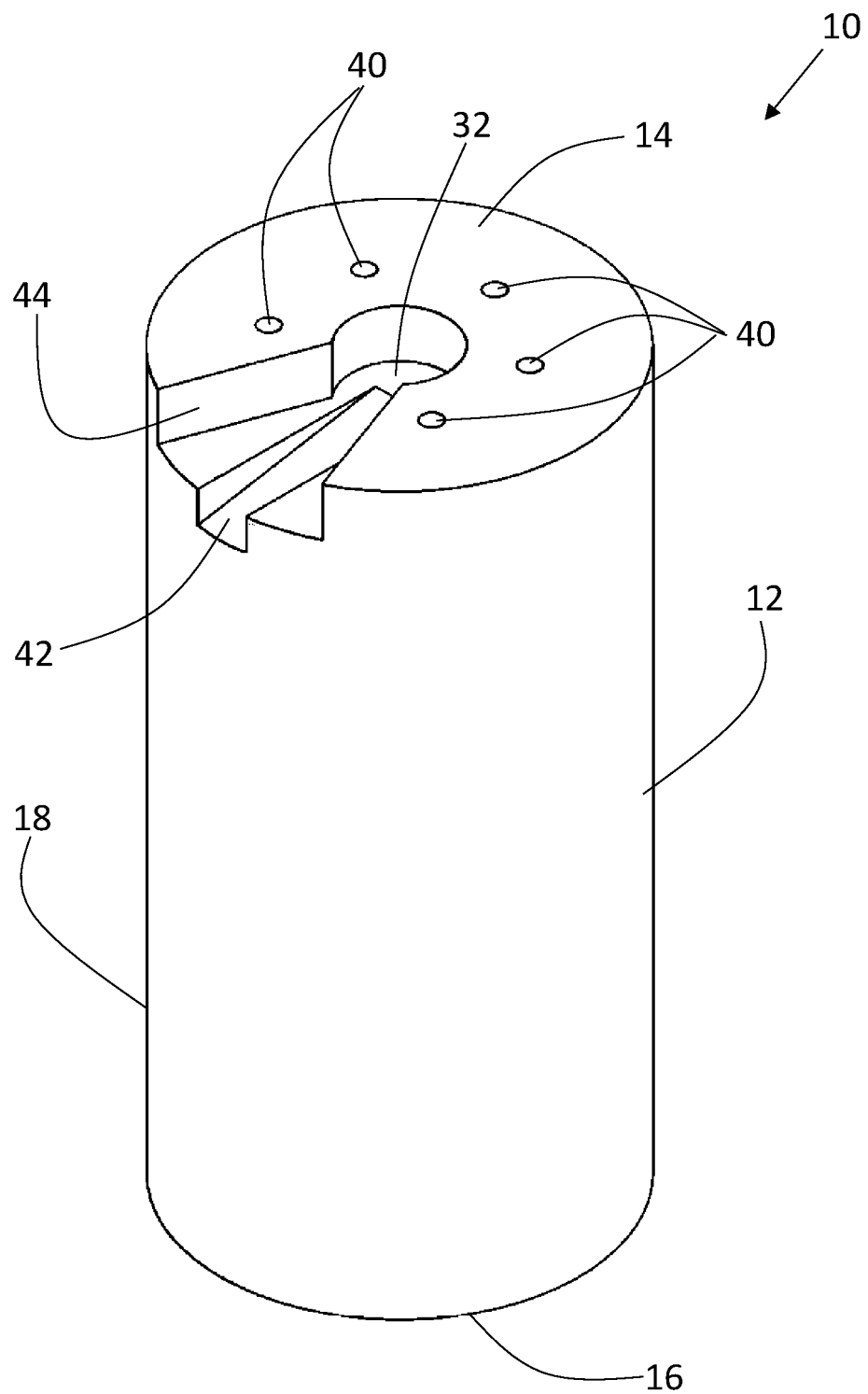
FIG. 5 is a perspective view of the liquid electrode tip shown in FIG. 1.

Referring to FIG. 4 and FIG. 5, in the embodiment shown, top 14 of housing 12 has a sloped cutout 42 for directing overflow of liquid exiting liquid outlet 22 away from staging area 32. A catch basin or other liquid collector, not shown, may be positioned on peripheral side wall 18 or below housing 12 to catch liquid overflow. A viewing cutout 44 may also be provided to maximize the field of view for a glow discharge.

A pump, not shown, is used to pump fluid from solution reservoir 24 to staging area 32 when liquid electrode tip 10 is in use. A person of skill will understand what types of pumps are appropriate for use in relation to SAGD and SCGD devices. The minimum pump rate required in association with liquid electrode tip 10 is substantially equal to the plasma uptake rate which may allow for minimal hazardous liquid waste generation. The low pump rate requirements may result in an increase in emission strength relative to traditional SCGD and SAGC designs.

Liquid electrode tip 10 eliminates the need for an overflow channel for the purpose of grounding that is commonly used in SAGD and SCGD designs. There may be several potential benefits to having an alternative method of grounding. Maintenance of the glow discharge is not dependent upon the integrity of an overflow channel which may reduce the incidence of discharge interruptions or arcing events. In addition, flow rates may be decreased to a minimum level required to sustain the plasma which may maximize the optical emission from the glow discharge.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A liquid electrode tip, comprising:
    a housing having a top, a bottom and at least one peripheral side wall, the housing having a liquid inlet and a liquid outlet, the liquid outlet being located at the top of the housing;
    a solution reservoir positioned within the housing, the solution reservoir having a solution inlet in fluid communication with the liquid inlet and a solution outlet in fluid communication with the liquid outlet;
    a conductor positioned within the housing, at least a portion of the conductor being submerged by a liquid in the solution reservoir, the liquid in the solution reservoir being a liquid to be tested; and
    a staging area at the top of the housing into which the liquid from the solution reservoir flows up from the liquid outlet.

2. The liquid electrode tip of claim 1 wherein the housing contains an insulating medium to shield the conductor and the solution reservoir from a solid electrode spaced above and adjacent to the top of the housing.

3. The liquid electrode tip of claim 1 further comprising a fluid channel in fluid communication between the solution outlet of the solution reservoir and the liquid outlet of the housing.

4. The liquid electrode tip of claim 1 further comprising at least one vent for venting bubbles from the solution reservoir to an exterior of the housing.

5. The liquid electrode tip of claim 4 wherein the at least one vent vents bubbles to the top of the housing.

6. The liquid electrode tip of claim 1 wherein the top of the housing has a sloped cutout for directing overflow of the liquid exiting the liquid outlet away from the staging area.

7. The liquid electrode tip of claim 1 wherein the top of the housing has a viewing cutout to maximize the field of view for a glow discharge.

8. The liquid electrode tip of claim 1 further comprising a pump for pumping fluid from the solution reservoir to the staging area.

9. The liquid electrode tip of claim 5 wherein the conductor has a loop, the loop being positioned below and adjacent the at least one vent.

10. A liquid electrode tip, comprising:
    a housing having a top, a bottom and at least one peripheral side wall, the housing having a liquid inlet and a liquid outlet, the liquid outlet being located at the top of the housing;
    a solution reservoir positioned within the housing, the solution reservoir having a solution inlet in fluid communication with the liquid inlet and a solution outlet in fluid communication with the liquid outlet;

a conductor positioned within the housing, at least a portion of the conductor being submerged by a liquid in the solution reservoir;

a staging area at the top of the housing into which the liquid from the solution reservoir flows from the liquid outlet; and at least one vent for venting bubbles from the solution reservoir to an exterior of the housing.

11. The liquid electrode tip of claim 10 wherein the housing contains an insulating medium to shield the conductor and the solution reservoir from a solid electrode spaced above and adjacent to the top of the housing.

12. The liquid electrode tip of claim 10 further comprising a fluid channel in fluid communication between the solution outlet of the solution reservoir and the liquid outlet of the housing.

13. The liquid electrode tip of claim 10 wherein the at least one vent vents bubbles to the top of the housing.

14. The liquid electrode tip of claim 10 wherein the top of the housing has a sloped cutout for directing overflow of the liquid exiting the liquid outlet away from the staging area.

15. The liquid electrode tip of claim 10 wherein the top of the housing has a viewing cutout to maximize the field of view for a glow discharge.

16. The liquid electrode tip of claim 10 further comprising a pump for pumping fluid from the solution reservoir to the staging area.

17. The liquid electrode tip of claim 13 wherein the conductor has a loop, the loop being positioned below and adjacent the at least one vent.

18. A liquid electrode tip, comprising:

a housing having a top, a bottom and at least one peripheral side wall, the housing having a liquid inlet and a liquid outlet, the liquid outlet being located at the top of the housing;

a solution reservoir positioned within the housing, the solution reservoir having a solution inlet in fluid communication with the liquid inlet and a solution outlet in fluid communication with the liquid outlet;

a conductor positioned within the housing, at least a portion of the conductor being submerged by a liquid in the solution reservoir;

a staging area at the top of the housing into which the liquid from the solution reservoir flows from the liquid outlet; and the housing contains an insulating medium to shield the conductor and the solution reservoir from a solid electrode spaced above and adjacent to the top of the housing.

19. The liquid electrode tip of claim 18 further comprising at least one vent for venting bubbles from the solution reservoir to an exterior of the housing.

20. The liquid electrode tip of claim 18 wherein the top of the housing has a sloped cutout for directing overflow of the liquid exiting the liquid outlet away from the staging area.

* * * * *